Patented Dec. 19, 1950

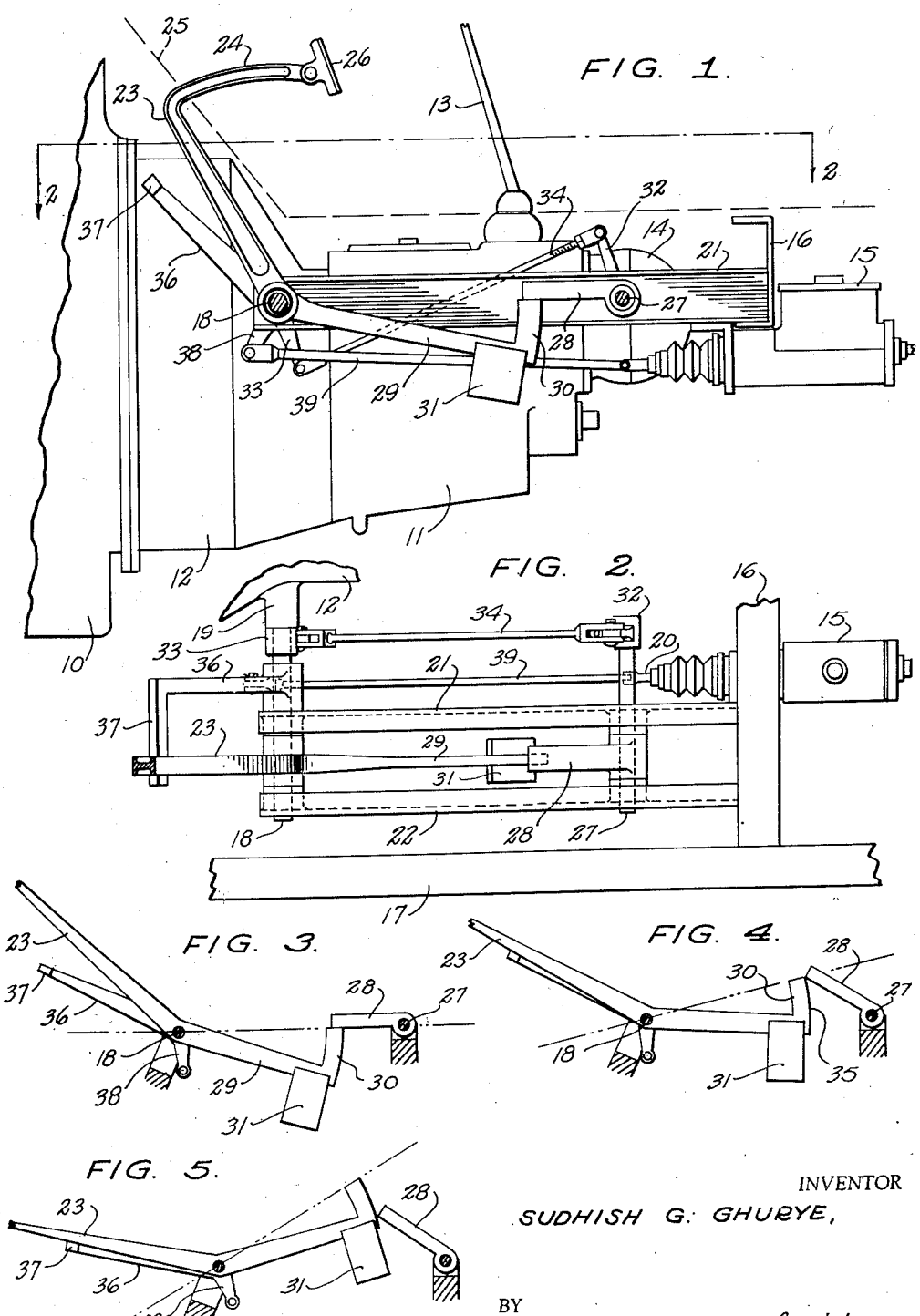

2,534,435

UNITED STATES PATENT OFFICE 2,534,435

CLUTCH AND BRAKE CONTROL FOR AUTOMOTIVE VEHICLES

Sudhish G. Ghurye, Chapel Hill, N. C.

Application October 14, 1949, Serial No. 121,356
In India October 5, 1948

3 Claims. (Cl. 74—478)

This invention relates to a clutch-and-brake control for an automotive vehicle, and more particularly to a clutch-and-brake-control assembly utilizing a single, driver-operated lever or pedal to successively operate the vehicle clutch and brakes.

It is among the objects of the invention to provide an improved clutch-and-brake-control assembly which utilizes a single, driver-operated lever or pedal to operate the clutch and brakes of an automotive vehicle in a manner such that the clutch is first released and the brakes subsequently applied, and the brakes are released and the clutch subsequently engaged, yet the pedal or lever is not subjected to the force of both the clutch-engaging spring and the brake-releasing spring at the same time, which assembly is simple and durable in construction and can be applied to an existing automotive vehicle with no material modification of the vehicle construction, or can be readily incorporated as a component part of a new vehicle, and which is safe and positive in operation, accomplishes its clutch and brake-operating functions within a reasonable range of movement of its driver-operated element, is economical to manufacture and install, and is easy to use.

Other objects and advantages will become apparent from a consideration of the following description and the appended claims in conjunction with the accompanying drawing, wherein:

Figure 1 is a side elevation of a fragmentary portion of an automotive vehicle showing, in side elevation, a clutch-and-brake-control assembly illustrative of the invention operatively applied to the vehicle, a portion of the control assembly being omitted and other portions shown in cross-section to better illustrate the construction of the assembly;

Figure 2 is a top plan view of the assembly and a fragmentary portion of the vehicle looking from the line 2—2 of Figure 1, one portion of the assembly being cut away and shown in cross-section; and Figures 3, 4 and 5 are diagrammatic illustrations of the main operative components of the assembly in three different operative positions.

With continued reference to the drawing, the fragmentary portion of the vehicle illustrated in Figure 1 includes a fragmentary rear portion 10 of a vehicle engine, a transmission housing 11, a clutch housing 12 connected between the engine and the transmission housing, a gear shift lever 13 extending upwardly from the transmission housing for shifting the transmission gears, a universal joint 14 at the rear end of the transmission housing and from which a drive shaft, not illustrated, extends toward the rear or drive axle of the vehicle, and a brake master cylinder 15 secured to a cross-member 16 of the vehicle frame or chassis. The vehicle portions shown in Figure 2 include a fragmentary portion of the clutch housing 12, the cross-member 16, the brake master cylinder 15 and a fragmentary portion of a frame side member 17.

A clutch-operating shaft 18 extends laterally outwardly from the clutch housing 12 through a housing boss 19 in which the shaft is journaled and rotation of this shaft is effective to release and engage the vehicle clutch. A plunger 20 extends from the front end of the brake master cylinder 15 and movement of this plunger rearwardly is effective to apply the vehicle brakes, while movement of the plunger forwardly permits the brake-release springs to release the brake, and the clutch is released by suitable spring included in the clutch mechanism, which spring is not illustrated.

The control assembly of the present invention comprises two spaced-apart, substantially parallel, reinforcing bars 21 and 22 which are connected at their rear ends to the frame cross-member 16 and extend forwardly to the clutch-operating shaft 18. Near their forward ends these bars carry suitable bearings in which the clutch shaft 18 is journaled. While the reinforcing bars 21 and 22 may be of any desired structural shape, bars of channel-iron shape, as illustrated, have been found to provide excellent results in use.

A driver-operated pedal 23 is journaled intermediate its length on the shaft 18 between the reinforcing bars 21 and 22. This pedal has, at its upper end, an angularly-projecting extension 24 which extends through a suitable opening in the vehicle floor boards, diagrammatically indicated at 25, and carries on its end a pivotally-mounted foot pad 26.

A bearing pin 27 is journaled in bearings carried respectively by the bars 21 and 22 at a location spaced from the shaft 18 and preferably located a short distance ahead of the frame cross-member 16. A lever 28 is secured on this pin 27 between the bars 21 and 22 and projects from the pin forwardly between the bars. An elongated extension 29 on the pedal 23 extends from the shaft 18 to a location adjacent the front end of the lever 28 and an arcuately-curved finger 30 projects upwardly from the extension 29 at the rearward end of the latter substantially perpendicular to the extension, and normally engages, at its upper end, the lever arm 28 near the front end of the latter.

A counter-weight 31 is attached to the pedal extension 29 near the finger 30 and acts to balance the weight of the pedal.

The pin 27 extends through the inner reinforcing bar 21 toward the universal joint 14 of the vehicle, and a second arm 32 is secured on the pin at this inner end thereof. The angular relationship between the lever arms 28 and 32 is such that these two lever arms, together with the pin 27 constitute a bell crank for operating the vehicle clutch. A lever arm 33 is secured on the clutch-operating shaft 18 against the outer end of the boss 19 and depends downwardly from this shaft, and an adjustable link 34 is connected between the free ends of the lever arms 32 and 33, so that the clutch will be disengaged when the bell crank is turned in one direction, and will be engaged when the bell crank is turned in the opposite direction.

When the pedal 23 is in its clutch-engaging, brake-releasing position, as illustrated in Figures 1 and 3, the upper end of the finger 30 underlies the lever arm 28 at the forward end of the latter, so that depression of the pedal by the driver will rotate this lever arm upwardly and rearwardly, turning the bell crank in a clutch-releasing position. As soon as the lever arm 28 has been turned an amount sufficient to completely release the clutch, the upper end of the finger 30 moves to the outer end of the lever arm 28, as illustrated in Figure 4, so that no further movement is imparted to the lever arm 28. The rearward surface 35 of the finger 30 is curved on an arc centered on the axis of the shaft 18, so that any further movement of the pedal 23, after the clutch has been fully engage, will merely hold the lever arm 28 in its clutch-releasing position without imparting any further movement thereto.

A brake lever 36 is journaled at one end on the shaft 18 between the inner reinforcing bar 21 and the clutch-housing boss 19 and has, at one end, a perpendicular offset 37 which underlies the shank of the pedal 23 and is engaged by the pedal shank after the pedal has been moved an amount sufficient to fully release the vehicle clutch. An arm 38 depends from the brake lever 36 at the end of the latter journaled on the shaft 18, and an adjustable link 39 connects the free or distal end of the arm 38 to the forward end of the brake master cylinder plunger 20, so that when the brake lever is depressed, the master cylinder will be operated to apply the vehicle brakes. This arrangement is thus effective to first release the vehicle clutch and to subsequently apply the vehicle brakes when the pedal 23 is brought to the position illustrated in Figure 5.

When the pressure on the pedal 23 is released, the usual brake and clutch springs will return the pedal to its initial position, first permitting the brake lever 36 to move to a position, as illustrated in Figures 1 and 3, in which the vehicle brakes are fully released, and subsequently permitting the bell crank lever arm 28 to move to the position illustrated in Figures 1 and 3 in which the vehicle clutch is fully engaged.

There is thus provided an assembly by means of which the clutch and brakes of an automotive vehicle are consecutively operated by a single, driver-operated element, such as a foot pedal.

This arrangement not only reduces the possibility of confusion in driving an automobile vehicle, and the amount of highly developed skill necessary for such driving, but permits efficient and accurate control of the clutch and brakes of an automotive vehicle by a disabled person having only one leg or foot which can be effectively used for this purpose.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Manually operated means for sequentially releasing a vehicle clutch and applying vehicle brakes comprising a supporting frame, shafts journaled in said frame in spaced apart and substantially parallel relationship to each other, a manually movable lever pivotally mounted intermediate its length on one of said shafts, means biasing said manually movable lever to a predetermined rotational position relative to said one shaft, a bell crank lever pivotally mounted intermediate its length on the other of said shafts for rotational movements about the axis of the latter, an arcuately curved finger on one end of said manually movable lever engageable with the distal end of one leg of said bell crank lever to rotate said bell crank lever to a predetermined angular extent upon movement of said manually movable lever to a predetermined angular extent in one direction from said predetermined position and to then hold said bell crank lever against return movement during further movement of said manually operated lever in the same direction, means extending from the other leg of said bell crank lever for connecting the latter to a vehicle clutch operating mechanism, and a vehicle brake operating lever rotatably mounted on said one shaft and having an offset engageable by said manually movable lever at the end of said predetermined extent of angular movement of the latter to move said brake operating lever in a brake operating direction upon continued movement of said manually movable lever beyond said predetermined angular extent.

2. Manually operated means for sequentially releasing a vehicle clutch and applying vehicle brakes comprising shafts disposed in spaced apart and substantially parallel relationship to each other, a foot pedal pivotally mounted intermediate its length on one of said shafts, means biasing said foot pedal to a predetermined rotational position relative to said one shaft, a bell crank lever pivotally mounted intermediate its length on the other of said shafts, means on one end of said foot pedal engaging the distal end of one leg of said bell crank lever to rotate said bell crank lever to a predetermined angular extent upon movement of said foot pedal to a predetermined angular extent in one direction away from said predetermined position and to then hold said bell crank lever against return movement during further movement of said foot pedal in the same direction, means extending from the other end of said bell crank lever for connecting the latter to a vehicle clutch operating mechanism, and a brake operating lever disposed adjacent said foot pedal and engaged by the latter for movement in a brake applying direction upon movement of said foot pedal in the same direction beyond said predetermined angular extent.

3. Means for sequentially releasing a vehicle clutch and applying vehicle brakes comprising a vehicle supported shaft, a foot pedal pivotally mounted intermediate its length on said shaft, means connected to said foot pedal biasing the latter to a predetermined angular position relative to said shaft, a vehicle supported lever adjacent said foot pedal, means on one end of said foot pedal engaging one end of said lever and moving the latter to a predetermined angular extent upon movement of said foot pedal to a predetermined angular extent from said predetermined angular position, said means holding said lever against return movement during further movement of said foot pedal in the same direction without imparting further movement to said lever, means extending from said lever for connecting the latter to clutch operating mechanism, and a vehicle supported brake operating lever disposed adjacent said foot pedal and engaged by the latter at the end of said predetermined extent of angular movement, said brake operating lever being moved in its brake applying direction by movement of said foot pedal in the same direction beyond said predetermined angular extent.

SUDHISH G. GHURYE.

REFERENCES CITED

The following references are of record in the file of this patent:

UNITED STATES PATENTS

| Number | Name | Date |
|---|---|---|
| Re. 20,036 | Des Rosiers | Sept. 1, 1936 |
| 1,885,442 | Holland | Nov. 1, 1932 |
| 1,932,884 | Dodge | Oct. 31, 1933 |
| 1,945,807 | Folberth | Feb. 6, 1934 |
| 1,964,112 | Evans | June 26, 1934 |
| 2,451,700 | Van Trine | Oct. 19, 1948 |

FOREIGN PATENTS

| Number | Country | Date |
|---|---|---|
| 467,560 | Great Britain | June 18, 1937 |